United States Patent [19]

Faulhaber et al.

[11] Patent Number: 5,214,519
[45] Date of Patent: May 25, 1993

[54] METHOD AND APPARATUS FOR PRODUCING A SPECIFIED FORMAT OUTPUT IMAGE FROM AN ARBITRARY FORMAT SOURCE IMAGE

[75] Inventors: Mark E. Faulhaber, Wilmington; Robert M. Taylor, Newark, both of Del.

[73] Assignee: E. I. Du Pont de Nemours and Company, Wilmington, Del.

[21] Appl. No.: 692,654

[22] Filed: Apr. 29, 1991

[51] Int. Cl.$^5$ .............................................. H04N 1/04
[52] U.S. Cl. .................................................... 358/451
[58] Field of Search ............... 358/451, 180, 140, 137, 358/138, 409–411; 382/47

[56] References Cited

U.S. PATENT DOCUMENTS

| | | | |
|---|---|---|---|
| 3,951,247 | 4/1976 | Montanari | 197/1 R |
| 4,067,021 | 1/1978 | Baylis et al. | 346/76 L |
| 4,080,634 | 3/1978 | Schreiber | 358/298 |
| 4,595,958 | 6/1986 | Anderson, Jr. et al. | 358/296 |
| 4,774,581 | 9/1988 | Shiratsuchi | 358/451 |
| 4,809,083 | 2/1989 | Nagano et al. | 358/451 |
| 4,837,619 | 6/1989 | Tsinberg | 358/140 |
| 4,862,285 | 8/1989 | Miyakawa | 358/451 |
| 5,138,454 | 8/1992 | Parulski | 358/180 |

Primary Examiner—Stephen Brinich

[57] ABSTRACT

The size of a digitally-stored image is modified as desired by expanding the source image data and adjusting the input to the output raster display device accordingly.

12 Claims, 3 Drawing Sheets

FIG. 1
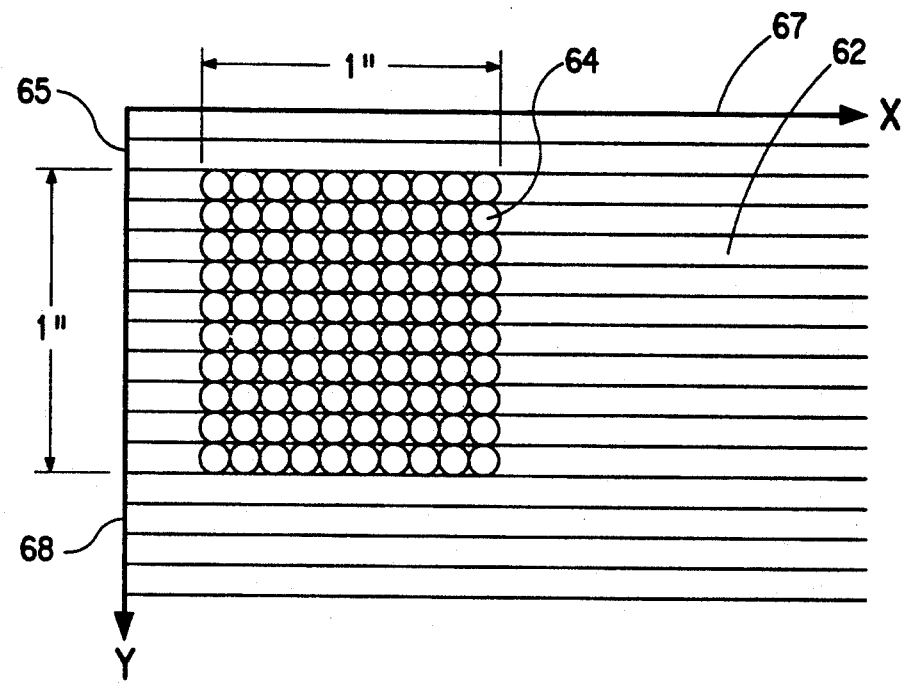
FIG. 2
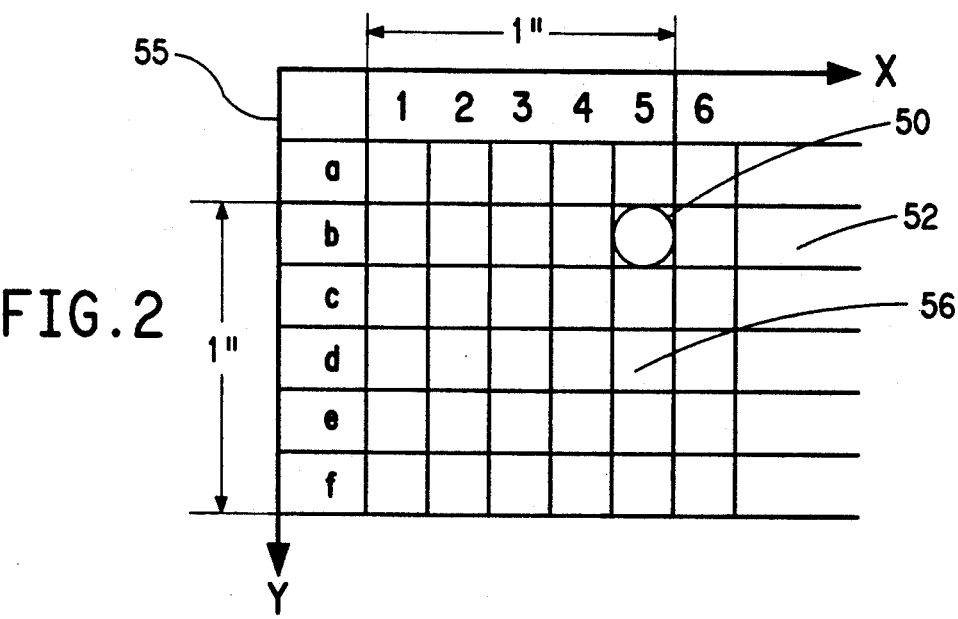
|   | 1 | 2 | 3 | 4 | 5 |
|---|---|---|---|---|---|
| A | 56 | 56 | 56 | 140 | 140 |
| B | 56 | 56 | 140 | 140 | 140 |
| C | 56 |   | 140 | 140 | 140 |
| D | 56 |   |   |   |   |
FIG. 3

METHOD AND APPARATUS FOR PRODUCING A SPECIFIED FORMAT OUTPUT IMAGE FROM AN ARBITRARY FORMAT SOURCE IMAGE

FIELD OF THE INVENTION

This invention relates to a method and associated apparatus for altering the output displayed size of digitally stored image and more particularly for electronically altering the size of a stored digital image so as to reproduce it using a raster display in a predetermined size and format.

BACKGROUND OF THE ART

Digital image storage is a process whereby an image is stored in a storage medium as a plurality of bits representing pixels (picture elements) of a given intensity. Digital storage offers a number of distinct advantages to image storage and transmission, image processing, image retrieval etc. over the more traditional hard copy. From the point of ready access, a computerized database, or even bulk storage on disk is easier to manipulate than paper folders containing film sheets. Image transmission over telephone lines to remote locations becomes possible. It is not therefore surprising that digital image capture, conversion and storage, finds great utility in applications where there is need for such advantages.

Applications are found in fields otherwise as diverse as medical diagnostic radiology and the publishing industry, where electronic page composition is becoming increasingly common. Often in such applications there is need to alter the original size of a given image data to fit within prescribed space limitations. These limitations are imposed by a number of extraneous factors which are usually the result of physical constraints in the output product, e.g., a sheet of film or paper on which one or more images are displayed. For instance, in a medical diagnostic application, it may be advantageous to display a number of different radiograms, side by side on a single radiological film for a physician to examine. Similarly, a number of distinct images and corresponding text may have to be fitted on a sheet of paper forming a magazine page. In both instances, it is rare that the original images all happened to be the exact size that will fit in the available space. In most cases the stored image size will have to be altered to a new size commensurate with the space it is to occupy in the display medium.

One possible solution, albeit cumbersome and slow, is to generate an image that is an exact duplicate of the original using the digital data, and then project this image using variable magnification lens systems onto a portion of a photosensitive film sheet. By varying the magnification the projected image can be made to fill the allocated space. The process is then repeated for each of the images and sizes used until the film sheet is filled.

One would rather, however, employ electronic means which operate directly and rapidly on the digital data to provide the displayed image data in proper format so that the displayed image fits exactly in the allocated space. That is one would rather have direct, electronic image magnification for image fitting and the ability to do so with or without altering the original image aspect ratio as desired. The image data could then be used to drive an output device which may be a laser printer scanner such as described in U.S. Pat. Nos. 4,080,634 or 4,067,021 or a CRT exposure tube. Similarly other printers employing a thermal head of the type disclosed in U.S. Pat. No. 3,951,247 may be used and the like.

A typical image produced by such device, is generated by writing with a moving spot of controlled (modulated) energy on a sensitive film sheet, point by point, along sequential raster lines, spots of variable density which correspond to the original pixel information that was extracted from an original image and stored in a storage medium.

This type of output display device is well known in the art, and need not be elaborated upon here, but will be referred to hereinafter as a recorder, (regardless of whether the raster is generated using electrical, mechanical or combination methods, and without regard to the nature of the writing source, provided such source is amenable to some form of output modulation control which alters the resulting density of the writing on an output film sheet).

To reproduce an original picture in exactly the same size, one simply selects a recorder having a spot size the same size as that of the scanner first used to acquire the stored image pixels. Thus a 3 inch by 3 inch rectangular image acquired with a scanner having a resolution of 300 pixels per inch in two orthogonal directions extending along X (horizontal) and Y (vertical) directions co-extensive with the image borders, can be reproduced exactly in a 3 inch by 3 inch space using a recorder capable of writing 300 spots and 300 lines per inch. The fitting of the original picture in the allotted space will be straightforward, one pixel to one spot and no data will be lost or artifacts created. However, if, for example, the original image is composed of 900 pixels×900 raster lines, which must be fitted in a 2×2 inch space using a recorder having a resolution of 1000 spots/inch and 1000 raster lines/inch, the resulting output image size in terms of spots and lines equals 2000×2000 spots for which we to provide intensity values. Therefore there is insufficient data from the original to fill the excess spots.

One solution used in the prior art is to generate fictitious pixel values from those on hand. The simplest way in this instance is to double the original pixels by replicating each at least once so that we now have an original image composed of 1800×1800 pixels and lines. This, however, only works for magnifications that are exact multiples of the original. Another approach is to try to predict values to generate imaginary pixels to fill the voids as shown in U.S. Pat. No. 4,595,958. However, there is a problem in the creation and allocation of pixels for the partial magnification, i.e., the need to magnify the image 2000/900=2.222 times. The generation of data for, and the distribution of, the extra 200×200 spots in the output image end up creating artifacts and/or image fuzziness in the final product.

U.S. Pat. No. 4,080,634 briefly discusses a method to scale original analog images for digital recording. According to its teachings, the scanning (reading) rate of an original image may be changed so that by the time the spot reaches the end of each line, a preselected number of samples have been taken for that line. At the same time, the rate of advancement of the image under the scanning line is modified so that the vertical scan distance compensates for the horizontal reading rate to maintain the original image aspect ratio.

The problem with such a process as applied to recording, is that the residence time of the spot per unit area changes, which in turn changes the exposure of the writing or recording medium. For small changes in magnification, this is not a problem, but for changes such as 2, 4, 8, or 10 times magnification, one starts encountering exposure problems, due to reciprocity failure and incorrect exposure in photosensitive systems, or thermal delay in thermally activated systems. The lines in the vertical direction become separated and the spaces between lines start becoming visible. There is still need for an effective image altering system capable of fitting an arbitrary digitally stored image retrieved from a storage medium into an arbitrary fixed allocated area in a display medium, which will not result in loss of information or introduction of artifacts or distortion.

SUMMARY OF THE INVENTION

The aforementioned difficulties may be resolved through a process for use in a raster scan type image reproduction system for fitting a source image comprised of source image data representing an arbitrary number of pixels and an arbitrary aspect ratio in a specified output image having a desired size and aspect ratio comprising the steps of:

(a) determining a desired output image size in at least one dimension, (b) determining a source image size in the same at least one dimension, and comparing said source image size to said output image size to obtain a ratio R in that at least one dimension (c) calculating a first integer I adjacent, preferably next higher, to the ratio R (d) digitally expanding the source image by expanding the source image data by a factor equal to the calculated integer I to generate an expanded output image data (e) calculating a sampling factor f where $f = I/R$, and (f) Sampling the expanded output data at a sampling rate controlled by the sampling factor f and use the sampled output data to drive an output raster display device, such as a recorder.

Still within the scope of the present invention, the raster scan system of the above process may scan a surface at a specified scan rate to generate an X-Y raster, and the factor $f = I/R$ may be used used to control such raster scan rate in both X and Y directions. Where the output data is used to modulate a writing beam intensity, the intensity of the beam may also be adjusted to compensate for changes in exposure resulting from a corresponding change in the sampling rate.

The process in accordance with the present invention may further comprise implementing the digital expanding step using any one of the following methods:

(a) Replication, or
(b) By-linear interpolation, or
(c) Cubic spline interpolation, or
(e) Two dimensional kernel convolution interpolation.

The process of this invention may be advantageously employed in instances where the desired output image size is determined based on optimum distribution of a given number of source images on a preselected size film sheet and more particularly, wherein the source images represent medical diagnostic images.

The present invention further comprises, associated apparatus for use with a raster scan type image reproduction recorder having control means to adjust a scanning rate in at least one dimension, the equipment adapted for accessing a source image comprised of source image data represented by an arbitrary number of pixels and an arbitrary aspect ratio, the data residing in a storage means, and for generating data for reproducing in said recorder said image in a specified output image format having a desired size and aspect ratio comprising:

(a) a central data processing means including means for accessing a preselected image data in a storage medium;

(b) means also in said central processing means for calculating:
  i. a ratio R where $R = $ output image size/source image size;
  ii. a first integer I adjacent, preferably next higher, to the ratio R; and
  iii. a quotient of the ratio R to the calculated integer I to obtain a sampling factor f where $f = I/R$;

(c) means controlled by said central processing means, for retrieving said preselected image data and for delivering said data to a data interpolating and storing means adapted to digitally expand the source image data by a factor equal to the calculated integer I to generate expanded output image data and to store at least a portion of such data; and (d) means associated with the central data processing means to apply the sampling factor f to a sampling rate control means to adjust the sampling rate of the expanded output data generated by the interpolator, and to supply said data to the recorder, and to also apply the sampling factor f to the control means for adjusting the vertical scanning rate of the recorder.

BRIEF DESCRIPTION OF THE DRAWINGS

The invention will next be described with reference to the attached drawings in which:

FIG. 1 shows a greatly enlarged portion of a raster image produced by a raster scan record.

FIG. 2 shows a greatly enlarged portion of an image as it is scanned by a readout scanner.

FIG. 3 shows a table used to store pixel image information.

DETAILED DESCRIPTION OF THE INVENTION

Figure 4:
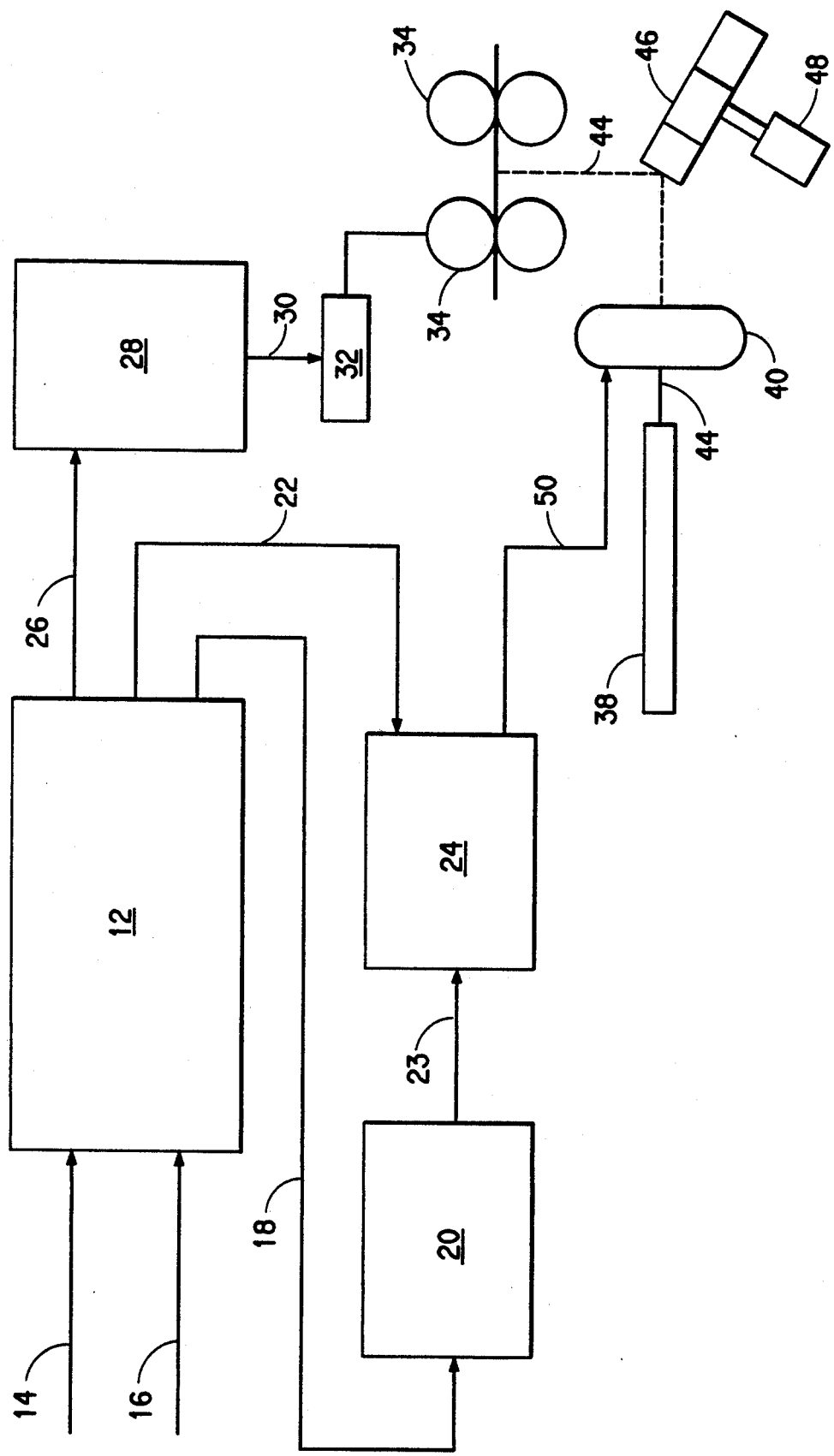
FIG. 4 represents in schematic format an apparatus for implementing the process of the present invention.

The invention will next be described with reference to the drawings which are used herein for illustration and as such are not intended to limit the invention to the specific embodiments depicted.

Referring first to FIG. 1 there is shown in schematic representation a greatly enlarged portion of an image reproduced using a raster scan recorder. The image is reproduced using a focussed beam of energy traveling across an imaging medium which upon exposure to the beam energy produces a visible image. The beam intensity is modulated to expose the imaging medium with variable energy levels. The image created on the medium may be viewed as comprising a series of spots 64 laid along a raster line 62 extending along one side 67 of a generally rectangular sheet 65. The spots are written on the sheet along the line 62 from left to right in a direction defined arbitrarily as the X or horizontal scan direction. The full surface of the sheet 65 may be viewed as covered with spots written along raster lines that are placed adjacent each other in a direction 68, generally perpendicular to the X direction arbitrarily defined as the Y or vertical scan direction. Individual spots are of course only detectable in a limiting case in which the modulation frequency and pattern of the beam intensity and the scanning rate have been selected to generate image spots. More typically in actual imaging situations the spots tend to blend together as the beam scans the imaging or writing medium. However the individual spot concept is maintained herein as an aid in explaining the problem and solution offered by the present invention. For the same purpose, the fact that the spot intensity is not constant across a spot diameter but falls of from the center outwardly usually in a Gaussian distribution manner, is also ignored, and the typical practice of taking an arbitrary point in the intensity curve, such as ½ of max., is used, creating an admittedly artificial but conceptually useful spot with distinct limits. All these concepts are well known in the art and are used to facilitate visualization of the claimed process, rather than limiting such process.

By studying the spot pattern shown in FIG. 1 it is seen that a recorder's resolution, i.e., the smallest individually distinguishable area of information is substantially the same as the smallest writing spot possible with that recorder, assuming that the modulator bandwidth is high enough so that a single spot written along the scan line will appear round on the exposed medium. It has thus become customary to identify a recorder's performance in terms of number of raster lines per inch, or if the spot is maintained symmetrical, in spots per inch writing capability, rather than in terms of minimal spot diameter size. For instance, a recorder may be given as having a resolution of 1000 (one thousand) spots per inch and being capable of handling sheets up to 10 (ten) inches wide. In describing this invention we will use spots and spots per inch to identify physical image sizes.

Similarly to image reproducing recorders, the size of a digitally captured image may be conveniently represented in terms of the number of picture elements available for a given image size. Thus in the case where an original image 55 shown in FIG. 2 is scanned with a moving spot 50 along a plurality of raster lines 52 and the output digitized, the result is a series of numbers corresponding to the smallest picture element distinguished by the scanning spot. This picture element or pixel 56 is at the scanning system limit similar to the scanning spot size of a recorder, and as in the case of recorders, reading or analyze scanners/digitizers are also identified by their resolution capabilities in terms of pixels per inch and total reading width capabilities.

In practicing this invention, the source of the data representing an image need not have been generated with a scanner/digitizer and a preexisting image. The same concepts apply in cases where the image is generated in raster format directly on a detector and immediately converted into digital format, as may be the case in certain forms of medical radiology, such as tomography and the like. Also, the image data may have been generated completely in a computer using for instance a drafting program. The same principles and definitions apply, each image being defined as being a particular size the size given in terms of number of pixels in two generally orthogonal dimensions. The source of the image data is not important.

FIG. 3 shows how the output of the scanner/digitizer may be stored in an image storage system. For each pixel there is an address, e.g., "b5", and an optical density value. This optical density value is represented by a digital number which in an 8 bit binary system ranges from 0 to 255. The address and the density value may be stored in a table as illustrated, for later access. The numbers of course could also be simply stored in plain serial form, with pointers to indicate end of lines, etc. The storage medium may be either a long term (such as tape, magnetic disk or optical disk) or volatile or permanent electronic memory.

FIG. 4 shows an arrangement of components including both hardware and software for practicing the present invention. The system may comprise a Central Processing Unit ("CPU 12") which may be a personal computer programmed to perform the necessary calculations and provide the needed output signals as will be explained below.

At least two information items are inputed, the output system parameter limitations, i.e., the system resolution in terms of spots per inch, and the output overall size in terms of total spots in each orthogonal (X-Y) direction. Line 14 indicates this input. The second input comprises the image size to be reproduced again in terms of total pixels in the X and Y directions. This input is represented by an line 16 in FIG. 4.

The source of information regarding the output size of the reproduced image is not shown in FIG. 4 since it is not essential for the practice of this invention. In a preferred application, where the reproduced images represent radiological images and where it is desirable to display a number of such images on a single film sheet, the following procedure is followed to determine the output image size.

Figure 5:
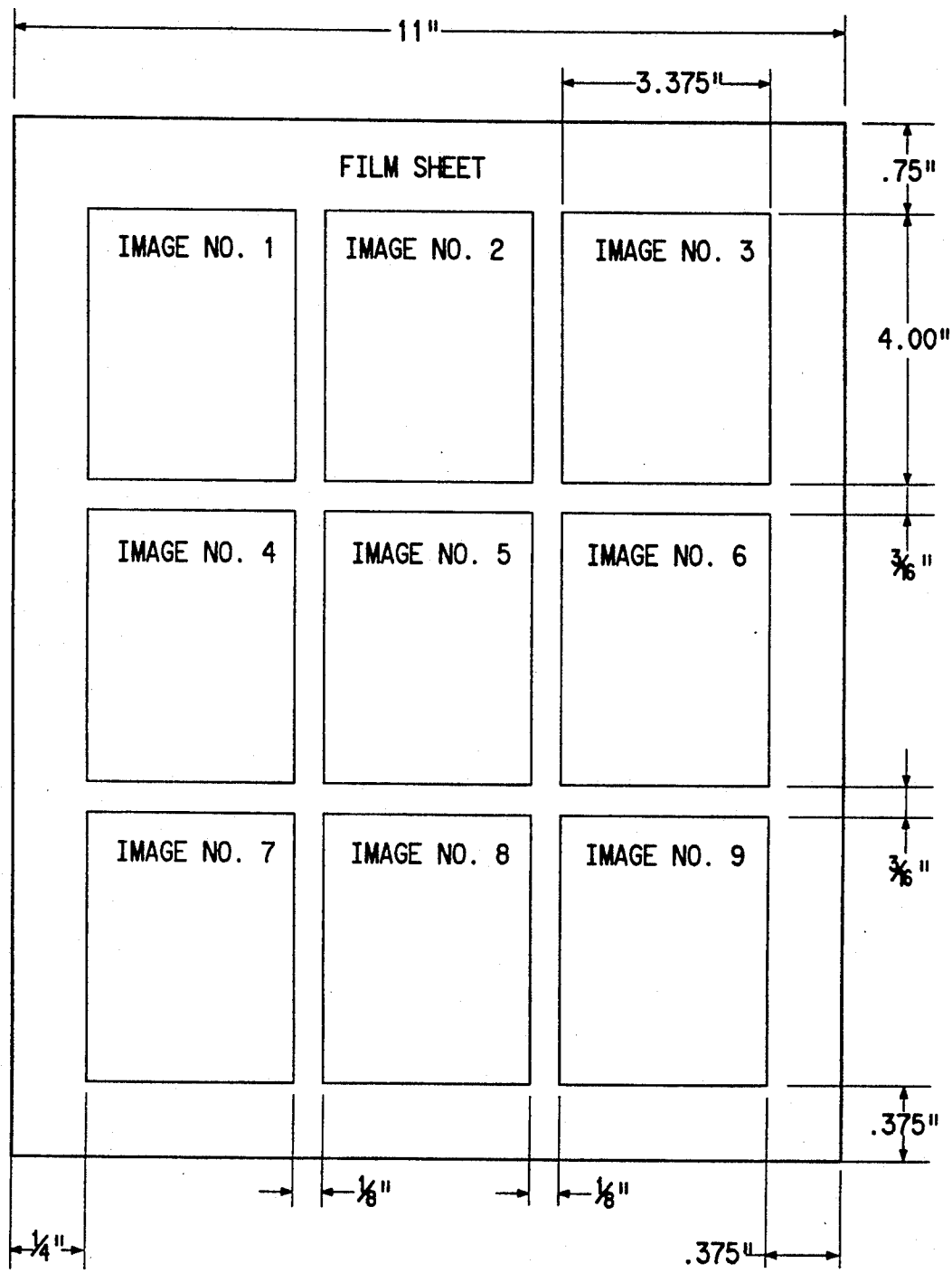
FIG. 5 shows a film sheet on which 9 (nine) images are displayed, arranged in accordance with the teachings of this invention.

Refer next to FIG. 5 in which an output film sheet is shown in reduced size. The film sheet is first identified in terms of physical size, e.g., 11 by 13.5 inches. The resolution of the recorder is noted, e.g., 300 lines per inch (and 300 spots per inch). Any display limitations are next considered. For instance, in order to permit clamping the film on a light source, a margin of three quarter inches (0.75") is allowed at the top. This corresponds to 225 raster lines (75 inches * 300 lines per inch) which are measured off to be left blank at the top of the sheet.

The balance 3300 horizontal spots by 3825 vertical raster lines define the available image area for the display of images. In this illustration, it is desired to display nine radiograms each with an aspect ratio of 0.84375. The original aspect ratio is to be maintained, i.e., the magnification is to be the same in both X and Y dimensions. Some margins and image separation are desirable. Using the technique to be described in detail below, it is determined that the images will fill the sheet in an optimal way that is achieving maximum utilization of the available film sheet surface if each image is displayed as 3.375 inches horizontally by 4.0 inches vertically. This corresponds to each image occupying the space of 1012.5 spots horizontally and 1200 raster lines vertically.

The above information is inputed through input 16 to the CPU 12. Of course if this calculation is done in the same computer as is likely the case, there is no need for an external input of the result which can preferably be internally supplied to the CPU for further processing. Other information is also provided to the CPU through additional inputs not shown here, such as data identifying the image to be retrieved for display, the position of the displayed image relative to the other images on the film sheet, patient identification text data, or other pertinent data to be also displayed, etc.

Once this information is provided to the CPU, the image is retrieved from the image data in some memory store generally depicted as block 20 in FIG. 4 connected to the CPU over a link 18. The selected data comprising values and addresses as shown in FIG. 5 are sent to a data processing block 24 over line 23, where an interpolation step occurs, after which data is temporarily stored in a buffer for use in displaying the image. The buffer may hold a completely expanded image, or in a preferred embodiment in order to limit memory needs, it may contain a limited number of lines at a time, and data processing, including input and output may occur simultaneously. The interpolator may further include buffer storage means to receive and hold data from memory 20 prior to the interpolation step, in addition to the buffer means for holding data after interpolation.

CPU 12 performs a number of operations in addition to selecting the images to be displayed. First the size of the original image selected is determined based on the stored image pixel data. In the present illustration, we will assume that the original data was captured in a typical TV monitor using a frame grabber, and that the image comprises 432 horizontal pixels by 512 vertical scan lines.

In order to fit this 432*512 pixel image in a space defined by 1012.5 * 1200 spots and lines in accordance with the present invention, we proceed as follows: In the CPU we calculate a ratio R corresponding to the ratio of the output image size in one dimension at least to the original image size in the same dimension. In this illustration, using the vertical (Y) dimension for convenience, this ratio is 1200 display raster lines divided by 512 original raster lines or, $R = 2.34375$.

Following determination of R the two nearest integers to R are identified. These are "2" and "3". Either may be used in practicing this invention, however it is preferred that the integer which is next higher to the value of R be selected as experience has shown that this results in more uniform appearing output images. Here this integer is $I = 3$.

The integer value is supplied through link 22 to the data processing block 24 which includes an interpolator to which data from the original image has also been provided. Based on the value of I, the incoming data from memory 20 is digitally expanded using any one of a number of known data expansion techniques such as replication, linear interpolation, cubic spline or two dimensional kernel convolution interpolation etc. In the preferred embodiment of this invention, the digital interpolator employs parallel processing hardware of the type disclosed in co-pending Ser. application No 07/692,655 filed concurrently herewith in the name of T. Byrne and assigned to the assignee of the present invention, the contents of this application being incorporated herein by reference. The expanded data is stored in a temporary buffer which provides sufficient storage capacity for the expanded data in terms of both horizontal and vertical expansion.

In the present numerical illustration, assuming that the digital expansion method selected is a simple replication, as each address value arrives from the stored original image data to the interpolator, it is stored as nine adjacent address values all with the same magnitude, three in adjacent horizontal addresses and the same three in each of three sequential lines in effect multiplying the incoming data by an integral factor in both the horizontal and vertical dimensions.

As a result, the temporary buffer now holds an image, or preferably a portion of an image which comprises no longer 432 pixels by 512 lines, but 1296 pixels by 1536 lines. Obviously this image even though closer in size to the available space still does not fit the desired output size of 1012.5 horizontal spots by 1200 vertical raster lines.

In a typical recorder arrangement, a radiation beam 42 emitted from a radiation source 38 is directed through a modulator 40 as a modulated beam 44 to impinge on a rotating mirror 46 driven by driving means 48 and therefrom onto the surface of moving film sheet 36 which it scans along a line generally transverse to the direction of movement of the film. The film sheet has a surface sensitive to the radiation of the beam. Driving means for moving the film sheet in a path past the scanning radiation beam 44 typically comprise rollers 34 and a driving motor 32.

In addition to calculating integer I CPU 12 is further programmed or otherwise adapted to calculate a second factor $f = I/R$. This factor is used to control the rate at which the data in the interpolator buffer is retrieved and supplied over line 50 to the recorder where it is typically used to modulate the intensity of beam 42 which in turn exposes film sheet 36.

Besides controlling the sampling rate of the data from the buffer in the interpolator, factor f is further used to modify the speed of the film sheet movement. Factor f is sent over cable 26 to a speed controller 28 connected via cable 30 to motor 32. Controller 28 adjusts the speed of motor 32 in a manner inversely proportional to f.

Of course f could also be chosen as the ratio of R/I in which case 1/f should be substituted in the applications above, and still be within the scope of this invention.

Returning now to the present numerical illustration, $f = I/R = 1.28$ and $1/f = 0.78125$. Using this information, the sampling rate of the buffer will be increased by 1.28 times the normal rate at which data is supplied to the recorder for writing in the X, or horizontal direction. At the same time the recorder drive of the film sheet is slowed by a factor of 0.78125 times the normal film sheet drive rate. As can be seen, both changes involve only small alterations in the sampling and drive rates, which do not result in detectable artifacts or distortions.

In a preferred embodiment this invention is best implemented using software and a computer adapted to operate in a system of the type shown in FIG. 4. The following text describes the algorithms for computing maximally efficient format structures for the output image size determination, and provides the necessary guidance for the preparation of appropriate software to implement this invention in a radiological environment.

Should the invention be applied in another environment, such as publishing, including desktop publishing, the same principles apply even though some of the algorithms must be modified, particularly those that relate to the image distribution in the film sheet and resultant calculation of the optimum image output size. Such modifications will be needed in order to accommodate output requirements of the specific application, e.g., page format, presence of more than one columns in a page, etc. The following process is therefore disclosed here as an example of a preferred embodiment in a particular application; the disclosed methodology on the other hand may be followed to provide software applicable to applications other than radiology, and such software is considered also be within the scope of the present invention.

In developing software to implement this invention in a medical radiography diagnostic environment, the following assumptions were made:
1. The writing spot is substantially symmetrical in cross section;
2. The film is scanned across its width, which is the shorter dimension for rectangular sheets and which is the X or horizontal direction referred to hereinabove;
3. The writing density (that is the number of written pixels per recorder spot) is, at least, equal to the optimum for the spot diameter. Changes in writing density, i.e., spots per inch, will cause greater overlap of adjacent spots. The spot density is adjusted symmetrically to preserve image aspect ratio on magnification. If the original image pixels are not symmetric, the horizontal writing density is adjusted to compensate;
4. Images of different pixel composition are permitted on the same sheet, but not in the same row. In this case, writing density will be calculated on the basis of the image having the largest primitive area (pixels * lines) to be displayed on a given sheet;
5. In mixed formats for images from the same source, writing density is computed for the smaller image. The larger images are displayed at the best integer magnification allowed by the rules defining the selection of borders.
6. The transport film sheet drive will transport the film past the exposure station at a rate which remains constant during the full image display; however, writing density may change between rows of images to accommodate images with asymmetric pixels. Otherwise, spot density will be constant for one sheet;
7. Within the constraints of 5 and 6, magnification by integer interpolation may be varied between rows of images.

Following are definitions for the variables used in describing Maximally Efficient Formatting:
FILMWID = Film width (short dimension), inches
FILMHGT = Film height (long dimension), in
TOPBOR = Top border, in
BOTBOR = Bottom border, in
SIDEBOR = Side border, in
BTWNBOR = Border between images, in
NUMWIDE = Number of images within the width of the film
NUMHIGH = Number of images within the height of the film
MXIMWID = Maximum image width, in
MXIMHGT = Maximum image height, in
FMTASPR = Format aspect ratio = MXIMWID / MXIMHGT
IMGWID = Formatted image width, in
IMGHGT = Formatted image height, in
IMGPIX = Source image width, pixels
IMGLIN = Source image height, lines
PIXASPR = Pixel aspect ratio (usually equals one)
IMGASPR = Image aspect ratio = IMGPIX * PIXASPR / IMGLIN
SPTDENS = Spot density, spots/in
PIXDENS = Pixel density, pixels/in = IMGPIX / IMGWID
LINDENS = Line density, lines/in = IMGLIN / IMGHGT
MAGNIFY = Magnification, spots/line = SPTDENS/LINDENS = (R)
INTRPOL = MAGNIFY rounded to next highest integer = (I)
DENSADJ = Density adjustment = INTRPOL / MAGNIFY = (f)

The first step is the determination of the desired output image size based on optimum distribution of a given number of source images on a preselected size film sheet, displayed so as to maximize use of the display surface area. Based on the minimum allowable border dimensions, the film is mapped to determine the maximum area available for each image in a given format:

$$MXIMWID = [FILMWID - 2*SIDEBOR - (NUMWIDE - 1)*BTWNBOR]/NUMWIDE \text{ and}$$

$$MXIMHGT = [FILMHGT - TOPBOR - BOTBOR - (NUMHIGH - 1) *BTWNBOR]/NUMHIGH$$

The above applies to formats having equal-size images. For mixed formats in which there are different size images on the same sheet, e.g., 6/2, the calculations are made on the base format first, e.g., 12 images per sheet. The rows of base format images are arranged, e.g., 2 rows of 3 images, then the remaining area is filled with the larger images as efficiently as the sheet spot density will allow, by changing only the value for integer interpolation.

In cases where it is desired to print images for viewing in horizontal (or landscape) rather than vertical (or portrait) orientation, the images can be rotated such that their pixels and lines are interchanged, and border dimensions will also be different; for example, the left SIDEBOR dimension will equal the TOPBOR minimum in subsequent computations.

Once the maximum dimensions of the images are computed, the source images selected for display are sized to fit in those dimensions. In typical radiological applications the header information for a sheet of images contains the format selected and the dimensions of all the images to be displayed on that sheet. Source image data are given as: IMGPIX, IMGLIN and PIXASPR.

The largest source image on the sheet is used for the calculations:

$$Largest\ image = [IMGPIX * IMGLIN * PIXASPR]max.$$

The best fit is obtained when the image is magnified until it reaches either MXIMWID or MXIMHGT. Which boundary is reached first can be predicted by comparing the aspect ratios of the format and the image:

If $IMGASPR > FMTASPR$, $IMGWID = MXIMWID$
and $IMGHGT = MXIMWID / IMGASPR$

If $IMGASPR < FMTASPR$, $IMGHGT = MXIMHGT$
and $IMGWID = MXIMHGT * IMGASPR$

The magnification required to map the image pixels into the format area is next arrived at as follows:

$$LINDENS = IMGLIN / IMGHGT$$

$$MAGNIFY = SPTDENS / LINDENS$$

Determine INTRPOL, then compute:

$$DENSADJ = INTRPOL / MAGNIFY$$

The DENSADJ value will be used to set the film transport speed and the pixel clock rate as follows: Under the assumption of a symmetrical spot, the horizontal (scanning direction) and the vertical (transport direction) resolution are the same, i.e., the same SPTDENS value. If the writing density is to be increased by DENSADJ, this is accomplished by slowing the transport rate and increasing the pixel clock rate by the same percentage.

*Adjusted transport rate = (Nominal transport rate)/DENSADJ*

*Adjusted pixel rate = (nominal pixel rate) \* DENSADJ*

The images to be printed are assembled contiguously in a memory large enough to hold a complete sheet. As described earlier in conjunction with FIG. 4, the source image data is concatenated with border pixels in a line buffer in a primitive state, i.e., uninterpolated, for each line to be written on the film. The buffer, containing enough lines for vertical interpolation, is integer-interpolated to a second, single-line buffer which holds INTRPOL \* the number of primitive pixels. The second buffer is then read at the pixel clock rate in synchronism with the scanned spot, one line at a time.

To calculate the number of pixels to assign to the borders, it is necessary to compute the primitive pixel density:

$$PIXDENS = IMGPIX / IMGWID \text{ pixels/in}$$

$$LINDENS = IMGLIN / IMGHGT \text{ lines/in}$$

From the pixel and line densities, border pixels and lines are simply the product of the border dimensions and the densities.

For example, $$TOPBOR \text{ pixels} = FILMWID * PIXDENS$$

$$TOPBOR \text{ lines} = TOPBOR * LINDENS$$

$$SIDEBOR \text{ pixels} = SIDEBOR * PIXDENS, \text{ etc.}$$

Finally there are two ways to arrange the images on a film sheet. Centered or grouped. In a centered arrangement the image is magnified from the center of the area defined by the minimum border dimensions so that unfilled area is symmetrically divided around the printed image. A grouped arrangement on the other hand uses the border between images to separate the images, and centers the whole group on the film. Either method can be accommodated as follows:

```
CENTERED IMAGES:
TOPBOR# = TOPBOR + [(MXIMHGT − IMGHGT)/2]
BOTBOR# = BOTBOR + []
BTWNBOR# = BTWNBOR + 2 * [] high
SIDEBOR# = SIDEBOR + {(MXIMWID − IMGWID)/2}
BTWNBOR# = BTWNBOR + 2 * {} wide
GROUPED IMAGES:
TOPBOR# = TOPBOR + NUMHIGH * []
BOTBOR# = BOTBOR + NUMHIGH * []
BTWNBOR# = BTWNBOR
SIDEBOR# = SIDEBOR + NUMWIDE * {}
```

In either case, the pixel and line composition of the adjusted borders (#) is determined by multiplying the computed dimensions by the appropriate spot densities.

In most cases, the images will fill the available width or height on the film. However, in those cases where there are mixed formats or mixed images, the adjusted border calculations must be made in both directions to present the non-optimum images properly. It may be better aesthetically to choose centering over grouping for mixed images.

Up to this point the invention has been described as applied to a symmetrical spot, using a square pixel. This is not to be construed a limitation to the claimed invention, and asymmetrical pixels may be treated in the same manner with the aforementioned techniques and equations. For example, a popular ultrasound imaging piece of equipment uses 768 pixels by 480 lines to define an image having a 4:3 aspect ratio. This means that the pixel aspect ratio is no longer 1.0 but 0.833. To handle this problem, we define R based on the assumption of square pixels, and modify the factor f by the pixel aspect ratio. R, as computed for in the Y dimension is:

R = Display raster lines / Original Image rater lines $f_y = 1/R$. This value controls the film drive speed as $1/f_y$.

$f_x = f_y/$ Pixel aspect ratio. This value controls the output clock rate, that is the rate at which data is read out of the Interpolator.

Thus, in cases where the pixel aspect ratio is different than 1.0, calculations as shown in the above example, must be made in both the X and Y dimensions.

Those having the benefit of the teachings of our invention as set forth above may attempt various modifications and applications not expressly set forth herein; thus, for example, the same principles and methods taught hereinabove may be equally advantageously applied to a multi-plane representation as is encountered in 3 or 4 color systems, and still remain within the scope of our invention. The invention is not limited to the specific embodiments described above, but rather is defined by the appended claims and their fair equivalents.

We claim:

1. A process for fitting a source image comprised of raster image data representing an arbitrary number of pixels and an arbitrary aspect ratio, in a specified raster output image having a desired size and aspect ratio comprising:

(a) determining a desired output image size in at least one dimension, (b) determining a source image size in the same at least one dimension, and comparing said source image size to said output image size to obtain a ratio R in that at least one dimension;

(c) calculating a first integer I adjacent to the ratio R;

(d) digitally expanding the source image by expanding the source image data by a factor equal to the calculated integer I to generate an expanded output image data;

(e) calculating the quotient of the calculated integer I to the ratio R to obtain a sampling factor f where f = I/R;

(f) sampling the expanded output data at a sampling rate controlled by the sampling factor f, and (g) using the sampled output data to drive an output display device.

2. The process in accordance with claim 1 wherein the the integer I is the next higher integer to the ratio R.

3. The process in accordance with claim 1 or 2 wherein the raster scan system scans a surface at a scan rate and wherein the factor $f=I/R$ is also used to control the raster scan rate.

4. The process in accordance with claims 1 or 2 wherein the output data is used to modulate a writing beam intensity and wherein the intensity of the beam is also adjusted to compensate for a change in exposure needed to compensate for a corresponding change in the line spacing.

5. The process in accordance with claim 1, or 2, wherein the digital expanding step is performed using any one of the following methods:
   (a) Replication, or
   (b) Bilinear interpolation, or
   (c) Cubic-spline interpolation, or
   (e) Two dimensional kernel convolution interpolation.

6. The process of claim 1 or 2, wherein the desired output image size is determined based on optimum distribution of a given number of source images on a preselected size film sheet.

7. The process of claim 1 or 2, wherein the source images represent medical diagnostic images.

8. The process of claim 1, wherein the source image size in step (b) is determined in each dimension used, and the source image size is compared to the output image size sought, to obtain image ratios in each dimension used, and wherein the integer I calculated in step (c) is the first higher integer adjacent to the larger of the two image ratios determined, said larger ratio being identified as R.

9. A process in accordance with claim 1 wherein the source image pixels have an aspect ratio other than one, and the source and output images comprise an arbitrary number of raster lines each, and wherein, R = ratio of the display raster lines to the original raster lines.

10. A process in accordance with claim 9, wherein the factor f is used to control the raster scan rate of the display device, and the ratio of the factor f to the pixel aspect ratio is used to control the sampling rate of the expanded output data.

11. Apparatus for use with a raster scan type image reproduction recorder having control means to adjust a scanning rate in at least one dimension, the equipment adapted for accessing a source image comprised of source image data represented by an arbitrary number of pixels and an arbitrary aspect ratio, the data residing in a storage means, the equipment further adapted for generating data for reproducing in said recorder said image in a specified output image format having a desired size and aspect ratio comprising:

(a) a central data processing means including means for accessing a preselected image data in a storage medium;

(b) means also in said central processing means for calculating:
   i. a ratio R where R=output image size/source image size;
   ii. a first integer I adjacent, next lower or next higher, to the ratio R; and
   iii. a quotient of the ratio R to the calculated integer I to obtain a sampling factor f where $f=I/R$;

(c) means controlled by said central processing means, for retrieving said preselected image data and for delivering said data to a data interpolating and storing means adapted to digitally expand the source image data by a factor equal to the calculated integer I to generate expanded output image data and to store at least a portion of such data;

(d) means associated with the central data processing means to apply the sampling factor f to a sampling rate control means to adjust the sampling rate of the expanded output data generated by the interpolator, and to supply said data to the recorder; and to also apply the sampling factor f to the control means for adjusting the vertical scanning rate of the recorder.

12. The apparatus of claim 11, wherein the first integer I is the next higher integer to the ratio R.

* * * * *